US009311663B2

(12) United States Patent
Roberts

(10) Patent No.: US 9,311,663 B2
(45) Date of Patent: Apr. 12, 2016

(54) MEDIA CONTENT LOCATION METHODS AND SYSTEMS

(75) Inventor: Brian F. Roberts, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 849 days.

(21) Appl. No.: 13/530,654

(22) Filed: Jun. 22, 2012

(65) Prior Publication Data
US 2013/0346240 A1 Dec. 26, 2013

(51) Int. Cl.
G06Q 30/02 (2012.01)
H04W 4/02 (2009.01)

(52) U.S. Cl.
CPC ........ *G06Q 30/0281* (2013.01); *G06Q 30/0261* (2013.01); *H04W 4/02* (2013.01)

(58) Field of Classification Search
CPC ...................................................... G06Q 30/00
See application file for complete search history.

(56) References Cited

U.S. PATENT DOCUMENTS

| 6,851,090 | B1* | 2/2005 | Gutta et al. | 715/716 |
|---|---|---|---|---|
| 7,458,510 | B1* | 12/2008 | Zhou | G06Q 20/18 235/379 |
| 2005/0037748 | A1* | 2/2005 | Sawano | G01S 5/0009 455/423 |
| 2009/0048932 | A1* | 2/2009 | Barber | 705/14 |
| 2009/0100363 | A1* | 4/2009 | Pegg et al. | 715/765 |
| 2011/0209201 | A1* | 8/2011 | Chollat | 726/4 |
| 2011/0238474 | A1* | 9/2011 | Carr et al. | 705/14.23 |
| 2012/0029691 | A1* | 2/2012 | Mockus et al. | 700/232 |
| 2013/0324097 | A1* | 12/2013 | Roberts | H04W 4/001 455/418 |

OTHER PUBLICATIONS

Milward, S. (Sep. 6, 2011). Ubox App Vending Machines = Mobile Payments for Drinks and Snacks in China. Retrieved Dec. 21, 2015, from https://www.techinasia.com/ubox-app-vending-machiness.*
Maras, E. (Feb. 1, 2012). Mobile payment revolution begins. Retrieved Dec. 21, 2015, from http://www.vendingmarketwatch.com/article/10614061/mobile-payment-revolution-begins.*

* cited by examiner

Primary Examiner — Kathleen Palavecino
Assistant Examiner — Abby Flynn

(57) ABSTRACT

An exemplary method includes a media content location system 1) detecting a geographic location of a mobile device associated with a user, 2) determining, based on the detected geographic location of the mobile device, that a media content instance designated as being of interest to the user is available for vending at a media content store that is within a geographic vicinity of the mobile device, 3) directing the mobile device to present a graphical depiction of the geographic vicinity of the mobile device, and 4) directing the mobile device to present a graphical object representative of the media content instance within the graphical depiction of the geographic vicinity at a position that corresponds to a geographic location of the media content store. Corresponding methods and systems are also disclosed.

19 Claims, 14 Drawing Sheets

MEDIA CONTENT LOCATION METHODS AND SYSTEMS

BACKGROUND INFORMATION

Media content stores associated with (e.g., owned by) the same entity (e.g., Redbox kiosks) are often located at multiple locations within a particular geographic region (e.g., within a particular city, community, metropolitan area, etc.). A user desiring to rent, purchase, or otherwise access a media content instance (e.g., a movie or video game) from one of the media content stores located within the geographic region may ascertain the location of the various media content stores by accessing a map interface presented by a mobile device (e.g., a map interface associated with a mobile device application and/or a website). The map interface may display icons representative of the various media content stores within a graphical depiction of a map of the geographic region. The user may then select a particular icon to access additional information (e.g., an address) associated with the icon's corresponding media content store.

Unfortunately, it is difficult for a user to readily ascertain which of the various media content stores shown in the map interface have a particular media content instance of interest to the user available for vending (e.g., in stock and available for rental). For example, a user may have previously bookmarked (i.e., flagged) a media content instance as being of interest to the user. To determine whether the bookmarked media content instance is available for vending at the various media content stores, the user may have to switch to a different interface (e.g., a browsing interface), search for the media content instance within the different interface, and then select an option to present a list of media content stores that currently have the bookmarked media content instance available for vending. This process may be confusing, cumbersome, disjointed, and difficult to perform, especially when a user is interested in locating media content stores that have multiple media content instances of interest to the user that are available for vending.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
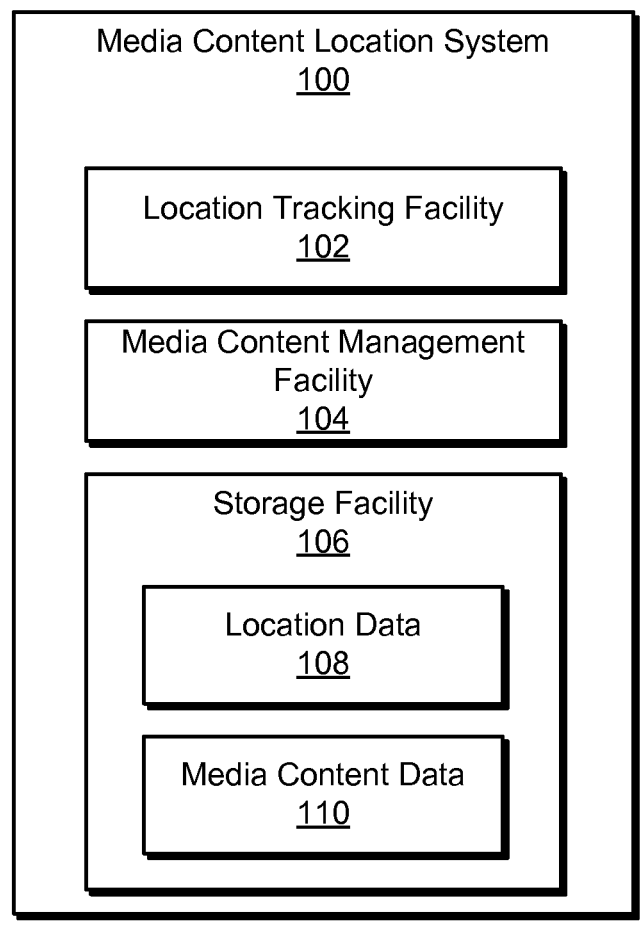
FIG. 1 illustrates an exemplary media content location system according to principles described herein.

Media content location methods and systems are described herein. As will be described below, a media content location system may 1) detect a geographic location of a mobile device associated with a user, 2) determine, based on the detected geographic location of the mobile device, that a media content instance designated as being of interest to the user is available for vending at a media content store that is within a geographic vicinity of the mobile device, 3) direct the mobile device to present a graphical depiction of the geographic vicinity of the mobile device, and 4) direct the mobile device to present a graphical object representative of the media content instance within the graphical depiction of the geographic vicinity at a position that corresponds to a geographic location of the media content store. Graphical objects representative of other media content instances designated as being of interest to the user and available for vending at the media content store and/or one or more other media content stores within the graphical vicinity of the mobile device may be concurrently presented within the graphical depiction of the geographic vicinity of the mobile device in a similar manner. In this manner, the user may readily ascertain, by viewing the graphical depiction of the geographic vicinity of the mobile device and without having to access one or more other interfaces, where the media content instances designated as being of interest to the user are located (i.e., where media content stores having the various media content instances available for vending are located).

To illustrate, a user may have bookmarked various movies as being of interest to the user. The user may then decide that she would like to rent one or more of the movies from a DVD vending kiosk associated with a particular entity (e.g., from a Redbox kiosk). To this end, the user may initiate an application associated with the entity (e.g., a mobile device "app") on his or her mobile device and select an option to view a graphical depiction of a map of the user's surrounding geographic vicinity. In accordance with the methods and systems described herein, graphical objects (e.g., movie posters) representative of the bookmarked movies may be presented within the graphical depiction of the map at positions that correspond to geographic locations of the DVD vending kiosks that have the various bookmarked movies available for vending (e.g., that have the various bookmarked movies in stock and available for rental). The user may then choose to visit a particular DVD vending kiosk based, for example, on the number of movies designated as being of interest to the user that are available at the DVD vending kiosk, reserve one or more of the movies for pickup, and/or take any other suitable action with respect to the movies. Various other benefits to the user and to the entity associated with the media content stores may be realized in accordance with the methods and systems described herein and will be described in more detail below.

As used herein, the terms "media content" and "media content instance" may refer to any tangibly embodied media content available for vending at a media content store. For example, a media content instance may include a DVD, CD, video game disk or cartridge, book, magazine, and/or any other type of tangibly embodied movie, video game, television program, audio content, and/or printed content as may serve a particular implementation. A "media content store" may refer to any kiosk, building (e.g., an electronics store, a book store, a library, etc.), and/or other type of physical structure that rents, sells, or otherwise vends media content.

FIG. 1 illustrates an exemplary media content location system 100 ("system 100"). As shown, system 100 may include, without limitation, a location tracking facility 102, a media content management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Location tracking facility 102 may be configured to track (e.g., detect) a geographic location of a mobile device associated with a user. Location tracking facility 102 may be configured to detect an exact location (e.g., latitude and longitude coordinates) of a mobile device. Alternatively, location tracking facility 102 may be configured to detect an approximate location (e.g., by way of triangulation) of the mobile device.

The tracking of the geographic location of the mobile device may be performed in any suitable way and using any suitable technologies, including, without limitation, Global Positioning System ("GPS") technologies and terrestrial signaling triangulation technologies. In certain embodiments, location tracking facility 102 may track the geographic location of a mobile device relative to (e.g., within) a particular geographic space (e.g., within a site premises such as a shopping mall, office building, or other structure). One or more wireless signaling transmitters may be employed to boost reception of location tracking signals within a site premises.

Media content management facility 104 may be configured to perform one or more media content management operations. For example, media content management facility 104 may designate one or more media content instances as being of interest to a user. This may be performed in any suitable manner. For example, media content management facility 104 may bookmark, flag, or otherwise designate a media content instance as being of interest to the user in response to and in accordance with a designation by the user that the media content in of interest to the user. To illustrate, a user may browse through a listing of media content instances available by way of one or more media content stores and add one or more of the media content instances to a queue, favorites list, or other list of media content instances of interest to the user.

Additionally or alternatively, media content management facility 104 may automatically designate one or more media content instances as being of interest to the user in accordance with a media content recommendation heuristic. For example, media content management facility 104 may automatically recommend one or more media content instances to the user based on a user profile associated with the user, a media content access history (e.g., a DVD rental history) of the user, a detected mood of the user, one or more tracked viewing habits of the user, one or more activities performed by other users (e.g., social media contacts of the user), and/or any other information associated with the user as may serve a particular implementation.

In some examples, media content management facility 104 may determine, based on the geographic location of the mobile device as detected by location tracking facility 102, that a media content instance designated as being of interest to the user is available for vending at a media content store that is within a geographic vicinity of the mobile device. This determination may be made in any suitable manner.

Figure 2:
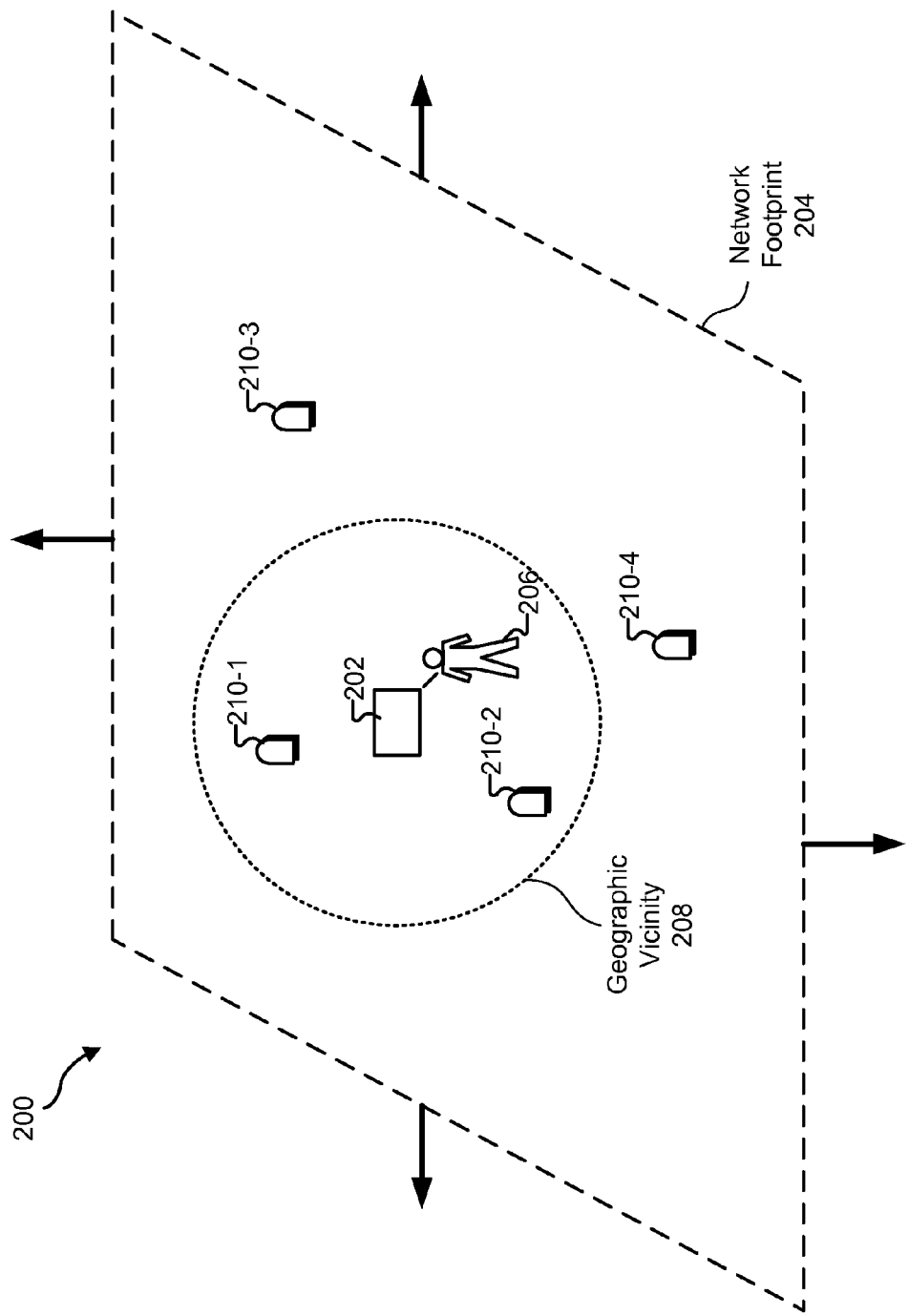
FIG. 2 shows an exemplary geographic vicinity of a mobile device according to principles described herein.

To illustrate, FIG. 2 shows a configuration 200 in which a mobile device 202 is physically located at a particular geographic location within an exemplary network footprint 204. Network footprint 204 refers to a collective geographic space within which mobile device 202 is able to receive and transmit network communication signals (e.g., signals to or from a satellite or a broadcast tower). As represented by arrows in FIG. 2, the reach of the network footprint 204 may extend beyond the illustrated portion of the network footprint 204.

Additionally, while FIG. 2 illustrates a two-dimensional network footprint 204, it will be understood that the network footprint 204 may be three dimensional in certain implementations.

Mobile device 202 may include a mobile phone, a smartphone, a tablet computer, a laptop computer, and/or any other mobile computing device as may serve a particular implementation. As shown, mobile device 202 may be associated with (e.g., carried and/or used by) a user 206.

FIG. 2 also illustrates an exemplary geographic vicinity 208 of mobile device 202. The boundaries of geographic vicinity 208 may be user-definable and may include any suitable area as may serve a particular application. For example, as shown in FIG. 2, geographic vicinity 208 may include a circle having a radius that is a predetermined distance from mobile device 202. In some examples, the boundaries of geographic vicinity 208 may correspond to the boundaries of a geographic map that may be presented within a display screen of mobile device 202. Hence, as the user zooms into the geographic map, the geographic vicinity 208 decreases in size. Likewise, as the user zooms out of the geographic map, the geographic vicinity 208 increases in size.

As shown, various media content stores 210 (e.g., media content stores 210-1 through 210-4) may be located within network footprint 204. Media content stores 210 may be within the geographic vicinity of mobile device 202 depending on the current location of mobile device 202. To illustrate, in the example of FIG. 2, media content stores 210-1 and 210-2 are currently located within the geographic vicinity 208 of mobile device 202 while media content stores 210-3 and 210-4 are currently located outside the geographic vicinity 208 of mobile device 202.

Hence, in order to determine that a particular media content instance designated as being of interest to the user is available for vending at a media content store that that is within the geographic vicinity 208 of mobile device 202, media content management facility 104 may first identify each media content store that is within the geographic vicinity 208 of mobile device 202. For example, media content management facility 104 may first determine that media content stores 210-1 and 210-2 are located within a geographic facility 208 of mobile device 202 (e.g., by determining that the geographic locations of media content stores 210-1 and 210-2 are within a predetermined distance of the geographic location of mobile device 202). Media content management facility 104 may then determine whether the media content instance designated as being of interest to the user is available for vending at either of the media content stores 210-1 and 210-2 (e.g., by accessing and analyzing a list of media content instances currently in stock at media content stores 210-1 and 210-2). In some alternative embodiments, media content management facility 104 may first identify each media content store 210 located within network footprint 204 that currently has the media content instance available for vending and then determine which of the identified media content stores 210 are located within geographic vicinity 208.

Once media content management facility 104 has determined that a media content instance designated as being of interest to the user is available for vending at a media content store that is within a geographic vicinity of the mobile device, media content management facility 104 may direct the mobile device to present a graphical depiction of the geographic vicinity of the mobile device and a graphical object representative of the media content instance within a graphical depiction of the geographic vicinity at a position that corresponds to a geographic location of the media content store.

Figure 3:
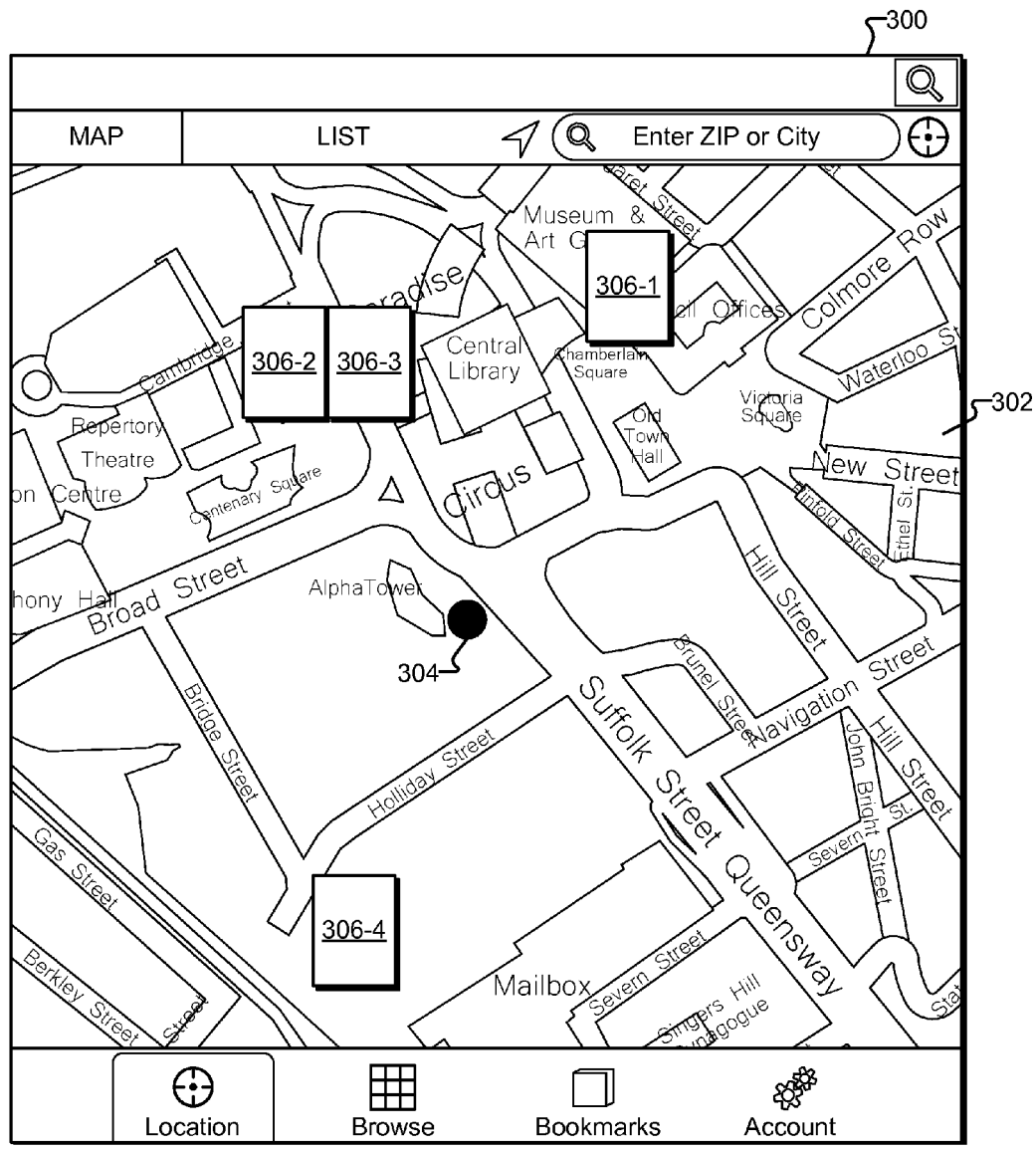
FIGS. 3-10 show various interfaces that may be presented in accordance with the methods and systems described herein.

To illustrate, FIG. 3 shows an exemplary interface 300 that may be presented by a mobile device and that may be configured to graphically portray a geographic vicinity of the mobile device. Interface 300 may be presented in the context of an application (e.g., a mobile device app) being executed by the mobile device. In some examples, the application may be provided by an entity associated with a plurality of media content stores (e.g., a business entity that owns or manages the media content stores). Alternatively, interface 300 may be presented within the context of a webpage being accessed by the mobile device.

As shown, interface 300 may graphically portray the geographic vicinity of the mobile device by presenting a graphical depiction of a geographic map 302 representative of the geographic vicinity of the mobile device. The geographic vicinity of the mobile device may be graphically portrayed in any other manner. For example, as will be described below, the geographic vicinity of the mobile device may be graphically portrayed as a radar image.

In some examples, as shown in FIG. 3, a graphical object 304 representative of the mobile device (and, consequently, the user associated with the mobile device) may be presented within the graphical depiction of the geographic vicinity of the mobile device at a position that corresponds to the detected location of the mobile device. In this manner, the user may readily ascertain his or her geographic location within the graphical depiction of the geographic vicinity of the mobile device.

FIG. 3 also shows that graphical objects 306 (e.g., graphical objects 306-1 through 306-4) representative of media content instances designated as being of interest to the user may also be presented within the graphical depiction of the geographic vicinity of the mobile device. Each graphical object 306 representative of a media content instance may be presented within the graphical depiction of the geographic vicinity of the mobile device at a position that corresponds to a geographic location of the media content store that has the media content instance available for vending. To illustrate, graphical object 306-1 is presented within the graphical depiction of the geographic vicinity of the mobile device at a position that corresponds to a geographic location of a media content store that has the media content instance represented by graphical object 306-1 available for vending.

In some examples, multiple graphical objects may be grouped together within the graphical depiction of the geographic vicinity of the mobile device to indicate that their corresponding media content instances are available at the same media content store. For example, graphical objects 306-2 and 306-3 are grouped together (e.g., adjacent one to another) within the graphical depiction of the geographic vicinity of the mobile device, thereby indicating that the media content instances represented by graphical objects 306-2 and 306-3 are available for vending at the same media content store.

In some examples, multiple graphical objects representative of the same media content instance may be presented within the graphical depiction of the geographic vicinity of the mobile device to indicate that the same media content instance is available for vending at multiple media content stores located within the geographic vicinity of the mobile device. For example, graphical objects 306-1 and 306-4 may be representative of the same media content instance. As shown in FIG. 3, these graphical objects 306-1 and 306-4 are presented at different positions within the graphical depiction of the geographic vicinity of the mobile device, thereby indicating that the media content instance represented by graphical objects 306-1 and 306-4 is available for vending at two different media content stores located within the geographic vicinity of the mobile device.

It will be recognized that one or more other graphical objects may be presented within the graphical depiction of the geographic vicinity of the mobile device shown in FIG. 3 as may serve a particular implementation. For example, as illustrated in FIG. 4, media content management facility 104 may direct the mobile device to present graphical objects 402 (e.g., graphical objects 402-1 through 402-3) representative of the media content stores that have the media content instances represented by graphical objects 306 available for vending within the graphical depiction of the geographic vicinity of the mobile device at positions that correspond to the geographic locations of the media content stores.

As another example, media content management facility 104 may direct the mobile device to present one or more graphical objects within the graphical depiction of the geographic vicinity of the mobile device that represent one or more amenities located within the geographic vicinity of the mobile device. For example, media content management facility 104 may direct the mobile device to present one or more graphical objects within the graphical depiction of the geographic vicinity of the mobile device that represent one or more restaurants, gas stations, grocery stores, and/or other types of businesses that offer services in which the user may be interested. The graphical objects representative of the one or more amenities may be presented within the graphical depiction of the geographic vicinity of the mobile device at positions that correspond to the geographic locations of the one or more amenities.

Figure 4:
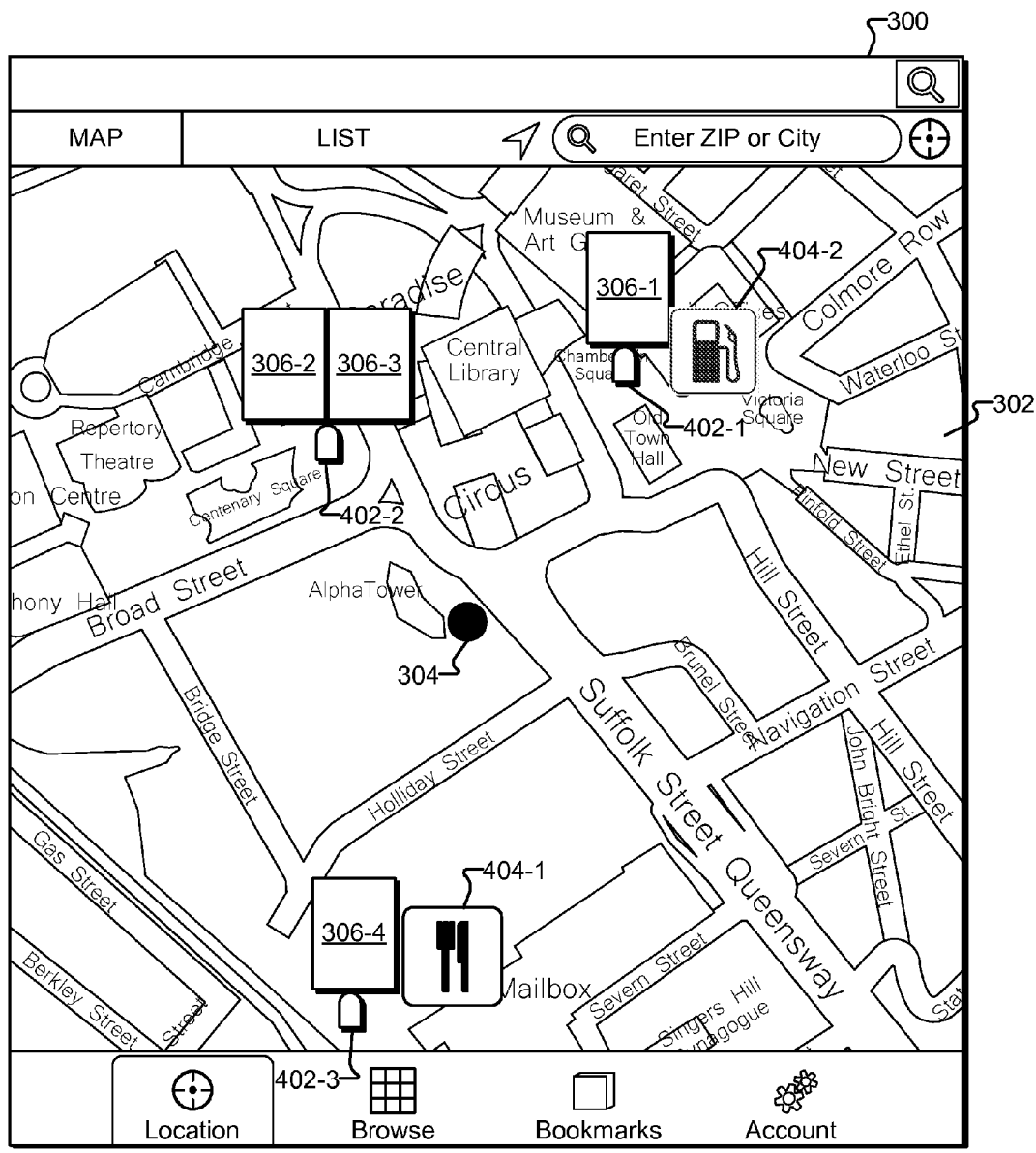

For example, FIG. 4 shows that media content management facility 104 may direct the mobile device to present a graphical object 404-1 representative of a restaurant within the graphical depiction of the geographic vicinity of the mobile device at a position that corresponds to a geographic location of the restaurant and a graphical object 404-2 representative of a gas station within the graphical depiction of the geographic vicinity of the mobile device at a position that corresponds to a geographic location of the gas station. In this manner, the user may readily determine that the restaurant is located relatively close to the media content store represented by graphical object 402-2 and that the gas station is located relatively close to the media content store represented by graphical object 402-1 and choose to visit one media content store over the other accordingly. Graphical objects 404-1 and 404-2 may be collectively referred to herein as "graphical objects 404".

In some examples, media content management facility 104 may determine which amenities are represented by graphical objects within the graphical depiction of the geographic vicinity of the mobile device in accordance with a user profile of the user, one or more tracked tendencies and/or likes of the user, a mood of the user, one or more agreements between providers of the amenities and a service provider (e.g., an agreement between a restaurant chain and a wireless carrier), and/or any other factor as may serve a particular implementation. For example, media content management facility 104 may determine that the user typically visits restaurants that sell pizza after renting a DVD from a DVD vending kiosk (e.g., by tracking a movement of the mobile device of the user after the user rents a DVD from a DVD vending kiosk). Based on this tracked tendency, media content management facility 104 may direct the mobile device to present graphical objects representative of restaurants that sell pizza (as opposed to restaurants that sell hamburgers) within the graphical depiction of the geographic vicinity of the mobile device.

Figure 5:
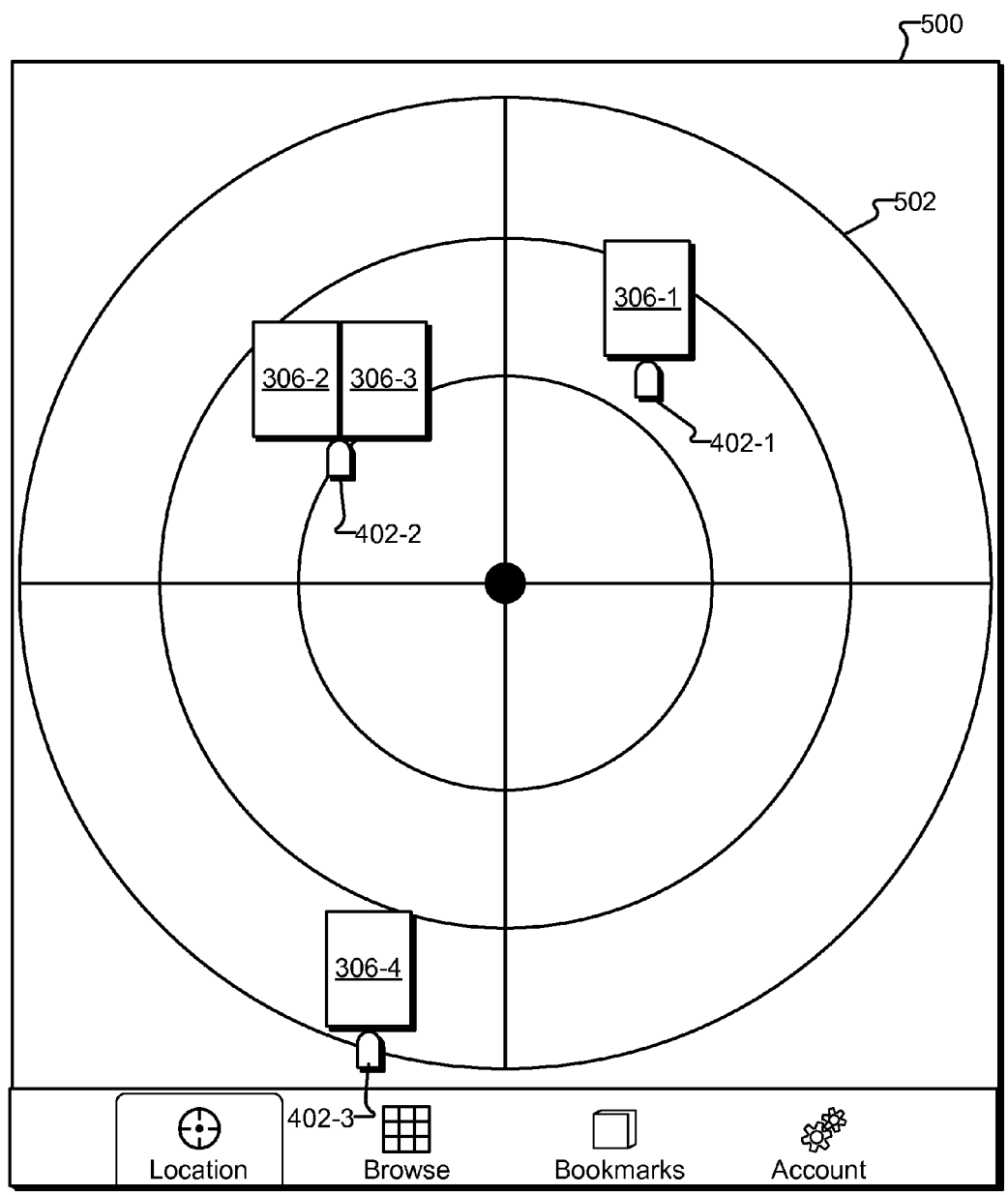

As mentioned, media content management facility 104 may additionally or alternatively be configured to direct the mobile device to present the graphical depiction of the geographic vicinity of the mobile device by directing the mobile device to present a graphical depiction of a radar image representative of the geographic vicinity of the mobile device. To illustrate, FIG. 5 shows an exemplary interface 500 that may be presented by a mobile device and that includes a graphical depiction of a radar image 502 representative of the geographic vicinity of the mobile device. As shown, graphical objects 306 and 402 may be presented within the graphical depiction of the radar image 502 in a manner similar to that described above in connection with FIGS. 3-4. Other types of graphical depictions of the geographic vicinity of the mobile device may be realized in accordance with the methods and systems described herein as may serve a particular implementation.

Each graphical object 306, 402, and/or 404 shown in FIGS. 3-5 may include any suitable image, text block, and/or or other graphic configured to represent a particular media content instance, media content store, and/or amenity as may serve a particular implementation. For example, each graphical object 306 representative of a media content instance may include a movie poster, cover art image, book cover image, or other identifying image.

In some examples, any of graphical objects 306, 402, and 404 shown in FIGS. 3-5 may be selected by a user to access additional information and/or options associated with the media content instances, media content stores, and/or amenities represented by the graphical objects 306, 402, and 404, respectively. For example, media content management facility 104 may detect a selection by the user of a graphical object representative of a media content instance and, in response, direct the mobile device to present one or more options associated with the media content instance.

Figure 6:
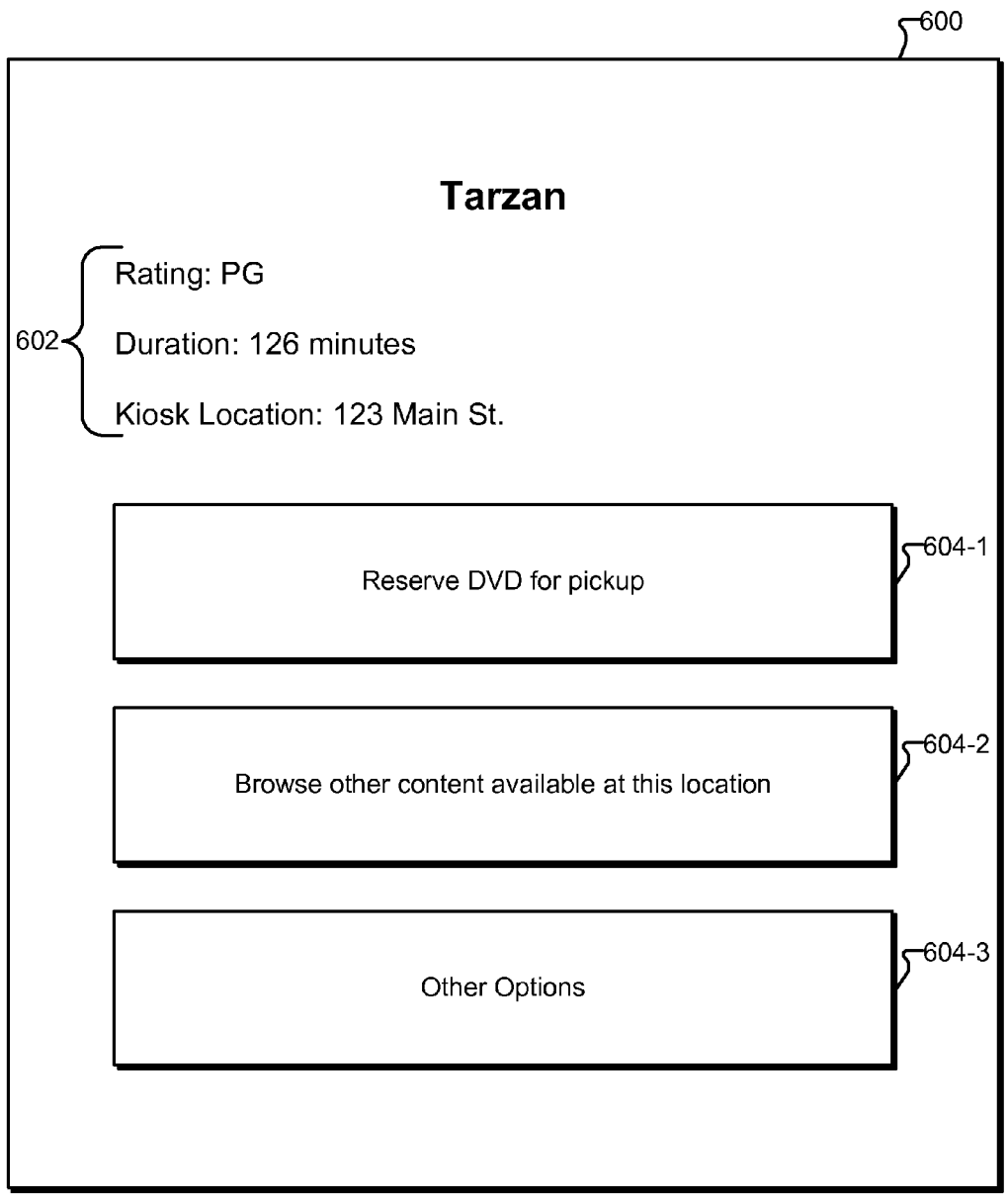

To illustrate, FIG. 6 illustrates an exemplary interface 600 that may be presented by a mobile device in response to a user selection of graphical object 306-1, which, in this example, represents a DVD movie entitled "Tarzan" that is available for vending at a DVD vending kiosk. As shown, interface 600 may include information 602 associated with the movie (e.g., information representative of a rating, duration, and/or kiosk location associated with the movie) and various options 604 (e.g., options 604-1 through 604-3) associated with the movie. For example, the user may select option 604-1 to reserve the movie for pickup (e.g., reserve the movie for in-person pickup within a certain amount of time), option 604-2 to browse other content (e.g., movies) available at the kiosk, and/or option 604-3 to access other options associated with the movie and/or the kiosk.

In some examples, media content management facility 104 may be configured to determine that a mobile device (and, hence, a user associated with the mobile device) enters into a geographic vicinity associated with a media content store and, in response, direct the mobile device to present an interface associated with the media content store. The geographic vicinity associated with the media content store may include any suitable geographic area in front of, surrounding, or otherwise associated with the media content store. For example, a geographic vicinity associated with a DVD vending kiosk may include a relatively small area surrounding or immediately in front of the DVD vending kiosk.

Once the mobile device has entered the geographic vicinity of the media content store, media content management facility 104 may direct the mobile device to present the interface associated with the media content store. This may be performed in any suitable manner. For example, media content management facility 104 may direct the mobile device to automatically launch or initiate an executable application associated with the media content store, download and install an executable application associated with the media content store from a remote server, access a webpage associated with the media content store, and/or otherwise automatically present content associated with the media content store. In some examples, the interface may be presented when the user manually initiates an executable application associated with the media content store while within the geographic vicinity of the media content store.

Figure 7:
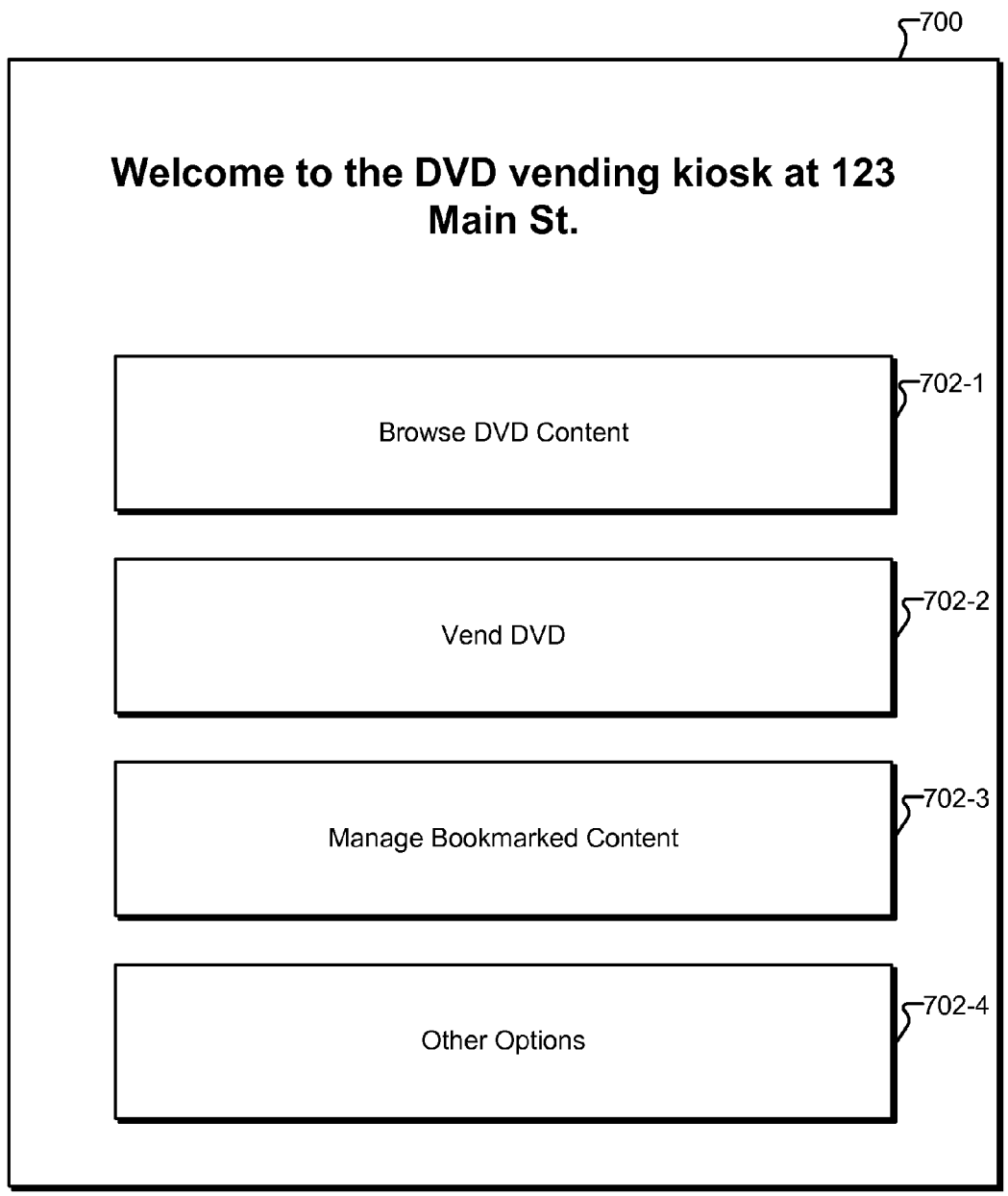

To illustrate, FIG. 7 shows an exemplary interface 700 that may be presented by a mobile device while the mobile device is within a geographic vicinity of a DVD vending kiosk. As shown, interface 700 may include various selectable options 702 (e.g. options 702-1 through 702-4) associated with the DVD vending kiosk. For example, a user may select option 702-1 to browse DVD content available for vending at the DVD vending kiosk, option 702-2 to vend a DVD from the DVD vending kiosk, option 702-3 to manage bookmarked media content available at the DVD vending kiosk, and/or option 702-4 to access one or more other options associated with the DVD vending kiosk.

As shown in FIG. 7, one of the options (i.e., option 702-1) that may be presented to the user while the user is within the geographic vicinity of a media content store may be to browse media content available for vending at the media content store. In some examples, media content management facility 104 may detect a selection by the user of the option to browse the media content available for vending of the media content store, and, in response, direct the mobile device to present a browsing interface that has been personalized to highlight one or more media content instances designated as being of interest to the user that are available for vending at the media content store.

Figure 8:
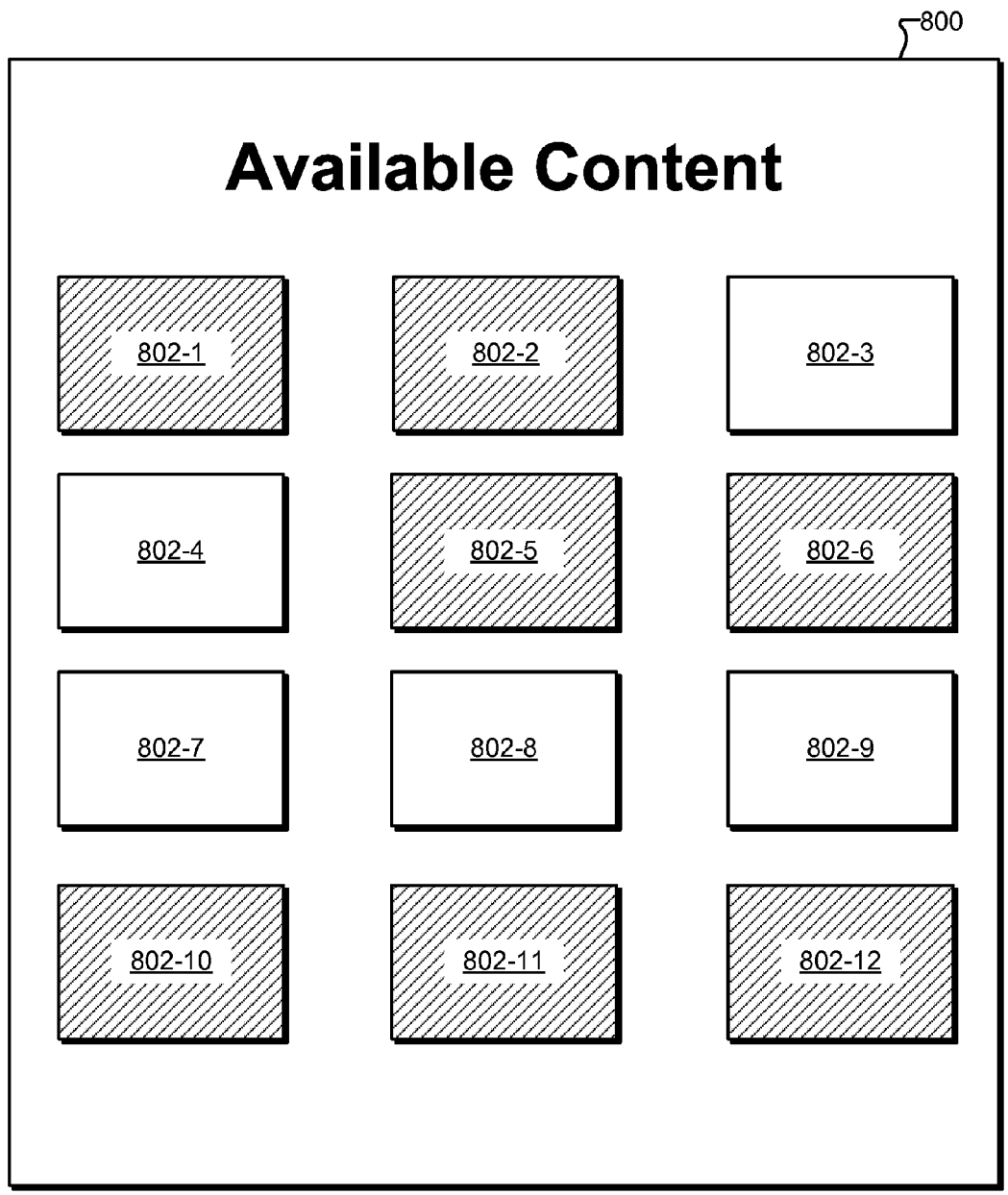

To illustrate, FIG. 8 shows an exemplary browsing interface 800 that may be presented by the mobile device in response to the user selecting option 702-1 shown in FIG. 7. As shown, a plurality of graphical objects 802 (e.g., graphical objects 802-1 through 802-12) each representative of a particular media content instance available for vending at the DVD vending kiosk may be presented within browsing interface 800. Each graphical object 802 may include a movie poster or other suitable graphic configured to represent a particular media content instance available for vending at the DVD vending kiosk. As shown, graphical objects 802-1, 802-2, 802-5, 802-6, 802-10, 802-11, and 802-12 are highlighted to indicate that their associated media content instances are designated as being of interest to the user. In this manner, the user may readily ascertain which media content instances designated as being of interest to the user are available at the DVD vending kiosk.

In some examples, a user may select a particular graphical object 802 to access one or more options associated with the media content instance represented by the graphical object 802. For example, the user may select graphical object 802-1 to access an interface similar to that shown and described in connection with FIG. 6. Using this interface, the user may reserve the selected media content instance for pickup and/or take any other action associated with the media content instance as may serve a particular implementation.

Returning to FIG. 7, another one of the options (i.e., option 702-2) that may be presented to the user while the user is within the geographic vicinity of a media content store may be to vend a particular media content instance that is available for vending at the media content store. For example, the media content instance may be a DVD that the user has reserved for pickup at the media content store. In some examples, media content management facility 104 may detect a selection by the user of the option to vend a particular media content instance, and, in response, direct the media content store and the mobile device to perform a vending transaction that results in the particular media content instance being vended to the user.

Media content management facility 104 may direct the media content store and the mobile device to perform the vending transaction in any suitable manner. For example, in response to the user selecting the option to vend the media content instance, media content management facility 104 may direct the media content store to present an option to pick up the media content instance. Media content management facility 104 may then detect a selection by the user of the option to pick up the media content instance, and, in response, direct the media content store to present a verification interface configured to allow the user to verify an identity of the user. Media content management facility 104 may then detect a verification by the user of the identity of the user by way of the verification interface and, in response, direct the mobile device to present an option to complete the vending transaction. Media content management facility 104 may then detect a selection by the user of the option to complete the vending transaction, and, in response, direct the media content store to vend the media content instance.

Figure 9:
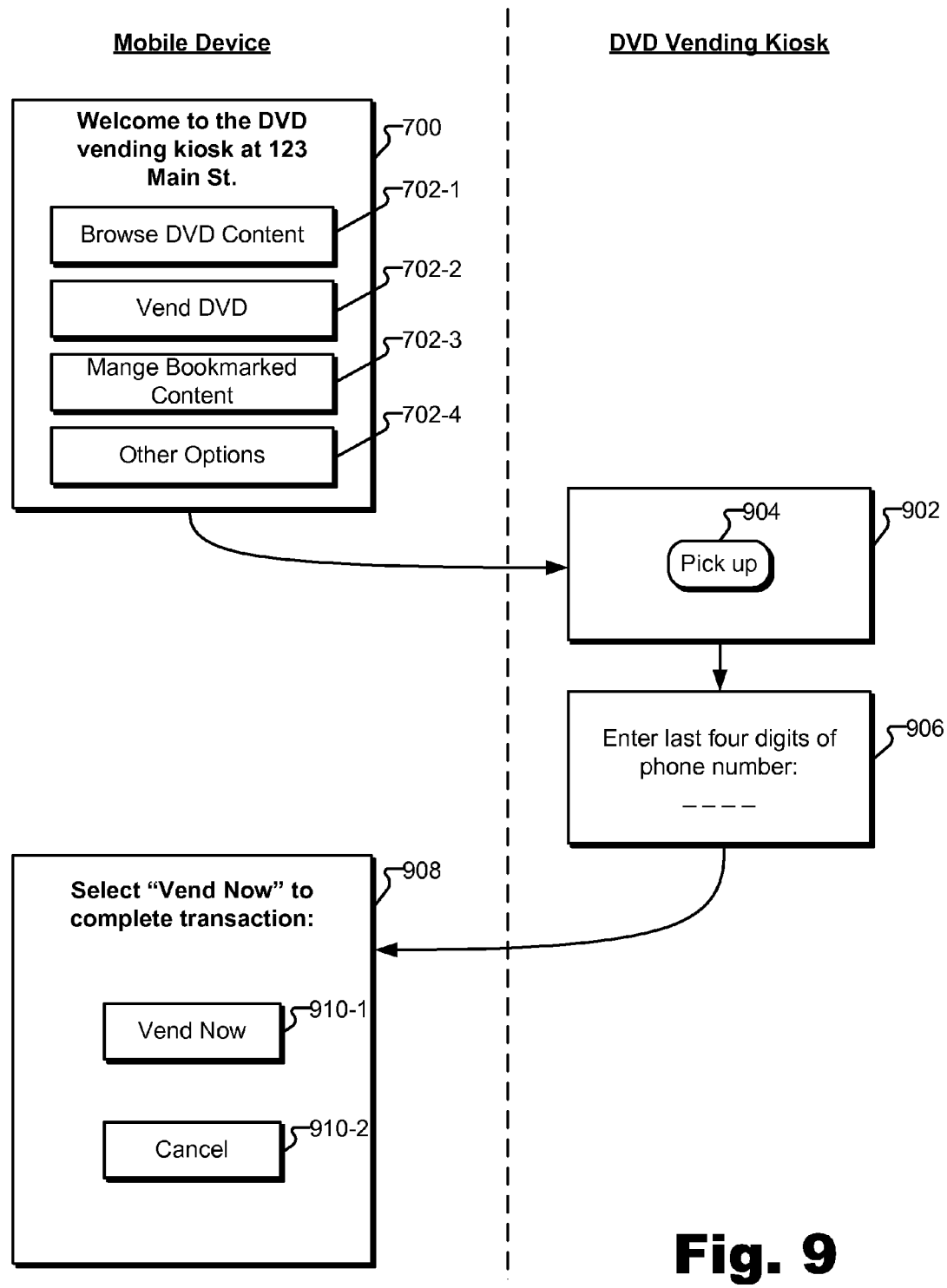

To illustrate, FIG. 9 shows a series of interfaces that may be presented by a mobile device and a DVD vending kiosk while the mobile device and DVD vending kiosk perform a vending transaction that results in a DVD being vended by the DVD vending kiosk to a user.

As shown in FIG. 9, the mobile device may initially present interface 700 described in connection with FIG. 7. To vend a DVD reserved for pickup, the user may select option 702-2. In response, DVD vending kiosk may present an interface 902, which may include an option 904 to pick up the DVD. Once the user selects option 904, the DVD vending kiosk may present a verification interface 906, which may allow the user to verify his or her identity. For example, as shown in FIG. 9, verification interface 906 may allow a user to enter the last four digits of his or her phone number. Verification interface 906 may facilitate user verification of his or her identity in any other suitable manner (e.g., by allowing the user to enter a username associated with the user) as may serve a particular implementation.

Once the user has verified his or her identity, the mobile device may present interface 908, which may include an option 910-1 to "vend now". In response to selection by the user of option 910-1, the DVD vending kiosk may vend (e.g., dispense) the DVD. As shown, interface 908 may also include an option 910-2 to cancel the vending transaction.

To facilitate the vending transaction described in connection with FIG. 9, the mobile device and media content store may each be configured to communicate directly one with another, with one or more other computing devices (e.g., one or more servers), and/or otherwise collaborate. Exemplary manners in which the mobile device and media content store may communicate will be described in more detail below.

In some examples, media content management facility 104 may be configured to determine, based on a geographic location of a mobile device as detected by location tracking facility 102, that a plurality of media content instances designated as being of interest to the user are available for vending at a plurality of media content stores that are within a geographic vicinity of the mobile device. Media content management facility 104 may then direct the mobile device to present a graphical depiction of the geographic vicinity of the mobile device and a plurality of graphical objects within the graphical depiction of the geographic vicinity at positions that correspond to geographic locations of the media content stores. In some examples, each graphical object represents an availability of one or more media content instances designated as being of interest to the user at a particular media content store located within the geographic vicinity of the mobile device.

Figure 10:
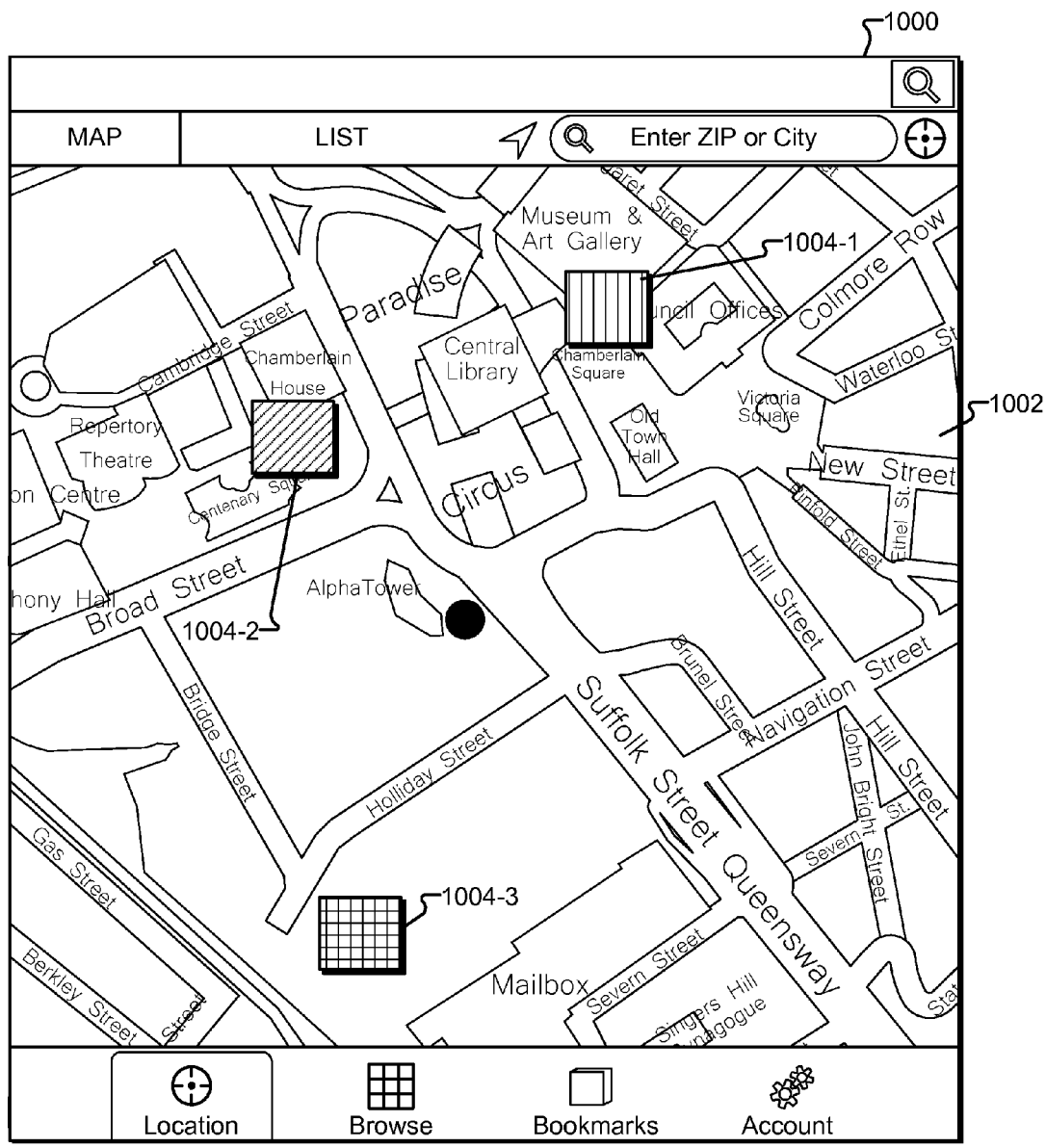

To illustrate, FIG. 10 shows an exemplary interface 1000 that may be presented by a mobile device and that may be configured to graphically portray a geographic vicinity of the mobile device. Interface 1000 may be similar to interface 300 described above in that it includes a graphical depiction of a geographic map 1002 representative of the geographic vicinity of the mobile device. Interface 1000 also includes a plurality of graphical objects 1004 (e.g., graphical objects 1004-1 through 1004-3) presented therein. Each graphical object 1004 represents an availability of one more media content instances designated as being of interest to the user at a particular media content store located within the geographic vicinity of the mobile device.

In some examples, one or more display properties of each graphical object 1004 may be set to graphically indicate one or more characteristics of the media content instances available at each media content store. For example, FIG. 10 shows that each graphical object 1004 has a distinct pattern. Each graphical object 1004 may additionally or alternatively have a distinct color, size, shape, and/or other distinguishing display property. The display properties of each graphical object 1004 may be configured to graphically indicate various characteristics of the media content instances available at each media content store. For example, each display property may graphically indicate a total number of media content instances designated as being of interest to the user that are available at a particular media content store, a particular category of interest of media content instances that are available at the particular media content store, and/or any other characteristic of the available media content instances at the particular media content store.

To illustrate, a display property (e.g., a color) of a graphical object 1004 may graphically indicate that media content instances of a particular genre that is of interest to the user are available at a particular media content store. Additionally or alternatively, a display property (e.g., a color) of a graphical object 1004 may graphically indicate that media content instances of a particular interest level (e.g., media content instances designated as being of great interest to the user and/or as being of moderate interest to the user) are available at a particular media content store.

In some examples, media content management facility 104 may be further configured to identify one or more media content stores that are within the geographic vicinity of a mobile device and that do not have available for vending any media content instances designated as being of interest to the user. Media content management facility 104 may accordingly prevent the mobile device from presenting one or more graphical objects representative of the one or more identified media content stores within a graphical depiction of the geographic vicinity of the mobile device. In this manner, the user may see only those graphical objects that are representative of media content stores that have one or more media content instances designated as being of interest to the user that are in stock and available for vending.

Returning to FIG. 1, storage facility 106 may be configured to maintain location data 108 generated and/or used by location tracking facility 102 and media content data 110 generated and/or used by media content management facility 104.

Storage facility 106 may maintain additional or alternative data as may serve a particular implementation.

Figure 11:
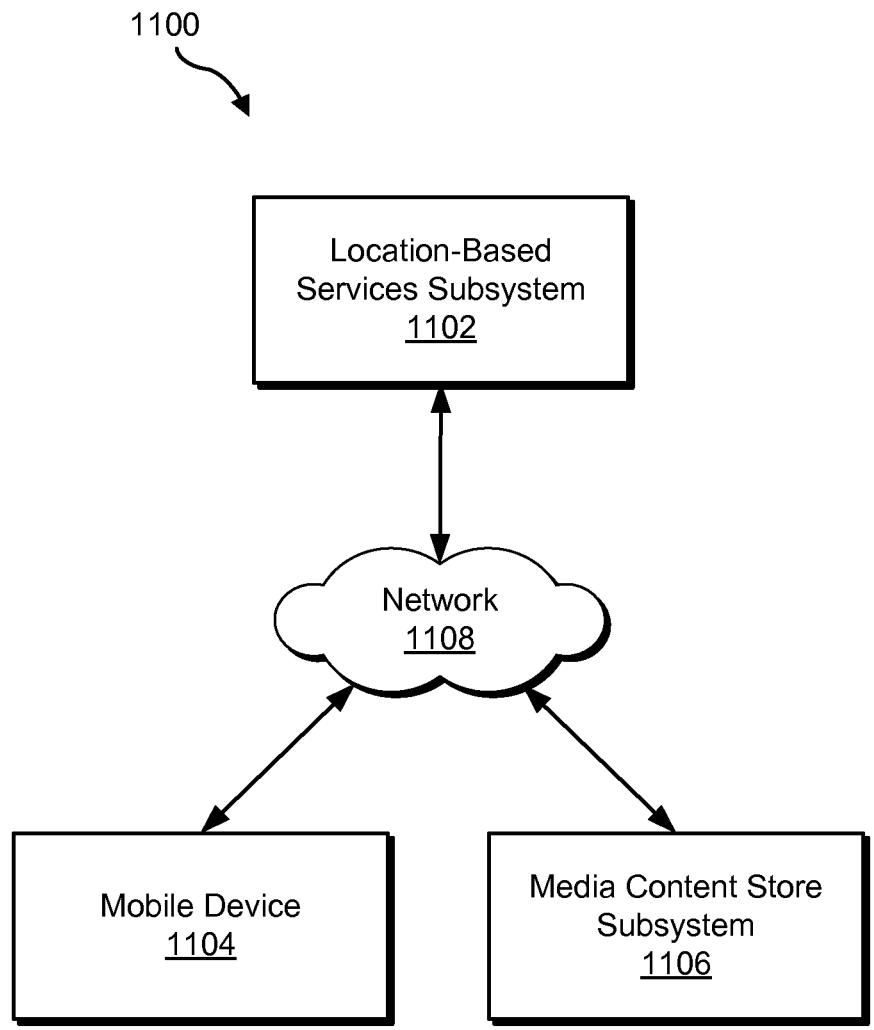
FIG. 11 illustrates an exemplary implementation of the system of FIG. 1 according to principles described herein.

FIG. 11 illustrates an exemplary implementation 1100 of system 100 in which a location-based services subsystem 1102 is communicatively coupled to a mobile device 1104 and to a media content store subsystem 1106. As will be described in more detail below, location tracking facility 102, application management facility 104, and storage facility 106 may each be implemented by location-based services subsystem 1102, mobile device 1104, and/or media content store subsystem 1106.

Location-based services subsystem 1102 may be configured to provide one or more location-based services. For example, location-based services subsystem 1102 may be implemented by one or more components (e.g., servers, computing devices, etc.) associated with a service provider (e.g., an Internet service provider, a wireless carrier, etc.) that provides location-based services to one or more users (e.g., one or more subscribers).

Mobile device 1104 may be implemented by any suitable mobile computing device. For example, mobile device 1104 may be implemented by a mobile phone, a smartphone, a tablet computer, a laptop computer, and/or any other mobile computing device as may serve a particular implementation. In some examples, mobile device 1104 may be configured to facilitate access by a user to one or more services provided by location-based services subsystem 1102. For example, mobile device 1104 may be configured to facilitate access to one or more location-based applications provided by location-based services subsystem 1102.

Media content store subsystem 1106 may be implemented by one or more computing devices configured to provide one or more media content store services and/or perform one or more media content store-related operations. For example, media content store subsystem 1106 may include a computing device included in a DVD vending kiosk.

Location-based services subsystem 1102, mobile device 1104, and media content store subsystem 1106 may communicate using any suitable communication technologies, devices, networks, media, and protocols supportive of remote data communications. For example, as shown in FIG. 11, location-based services subsystem 1102, mobile device 1104, and media content store subsystem 1106 may be configured to communicate with each other over a network 1108 (and communications links thereto). Network 1108 may include one or more networks or types of networks capable of carrying communications and/or data signals between location-based services subsystem 1102, mobile device 1104, and media content store subsystem 1106. For example, network 1108 may include, but is not limited to, a mobile phone network (e.g., a cellular phone network), a mobile data network (e.g., a 3G network, a 4G network, etc.), a telecommunications network, a wide area network (e.g., the Internet, a WiMax network, a mobile data network, etc.), other network capable of transporting communications and data between location-based services subsystem 1102 and mobile device 1104, and/or any combination or sub-combination thereof.

Location-based services subsystem 1102, mobile device 1104, and media content store subsystem 1106 may communicate over network 1108 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

In certain embodiments, system 100 may be implemented entirely by location-based services subsystem 1102 or by mobile device 1104. In other embodiments, components of system 100 may be distributed across any combination of location-based services subsystem 1102, mobile device 1104, and media content store subsystem 1106.

To illustrate, system 100 may be at least partially implemented by an operating system and/or a stand-alone application residing on mobile device 1104. The operating system and/or stand-alone application may be configured to allow a user to customize the various media content location features described herein.

Figure 12:
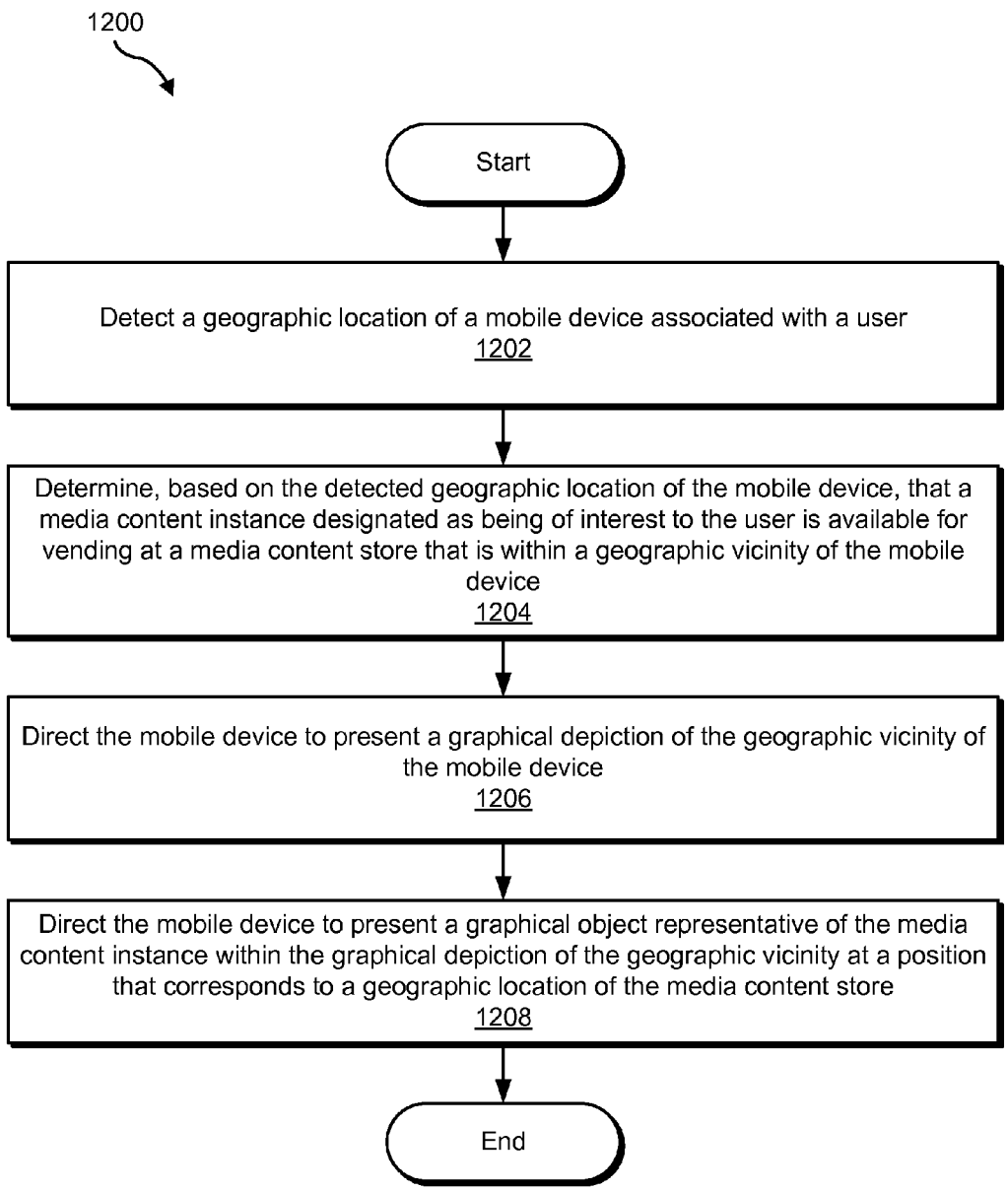
FIG. 12 illustrates an exemplary media content location method according to principles described herein.

FIG. 12 illustrates an exemplary media content location method 1200. While FIG. 12 illustrates exemplary steps according to one embodiment, other embodiments may omit, add to, reorder, and/or modify any of the steps shown in FIG. 12. One or more of the steps shown in FIG. 12 may be performed by media content location system 100 and/or any implementation thereof.

In step 1202, a media content location system detects a geographic location of a mobile device associated with a user. Step 1202 may be performed in any of the ways described herein.

In step 1204, the media content location system determines, based on the detected geographic location of the mobile device, that a media content instance designated as being of interest to the user is available for vending at a media content store that is within a geographic vicinity of the mobile device. Step 1204 may be performed in any of the ways described herein.

In step 1206, the media content location system directs the mobile device to present a graphical depiction of the geographic vicinity of the mobile device. Step 1206 may be performed in any of the ways described herein.

In step 1208, the media content location system directs the mobile device to present a graphical object representative of the media content instance within the graphical depiction of the geographic vicinity at a position that corresponds to a geographic location of the media content store. Step 1208 may be performed in any of the ways described herein.

Figure 13:
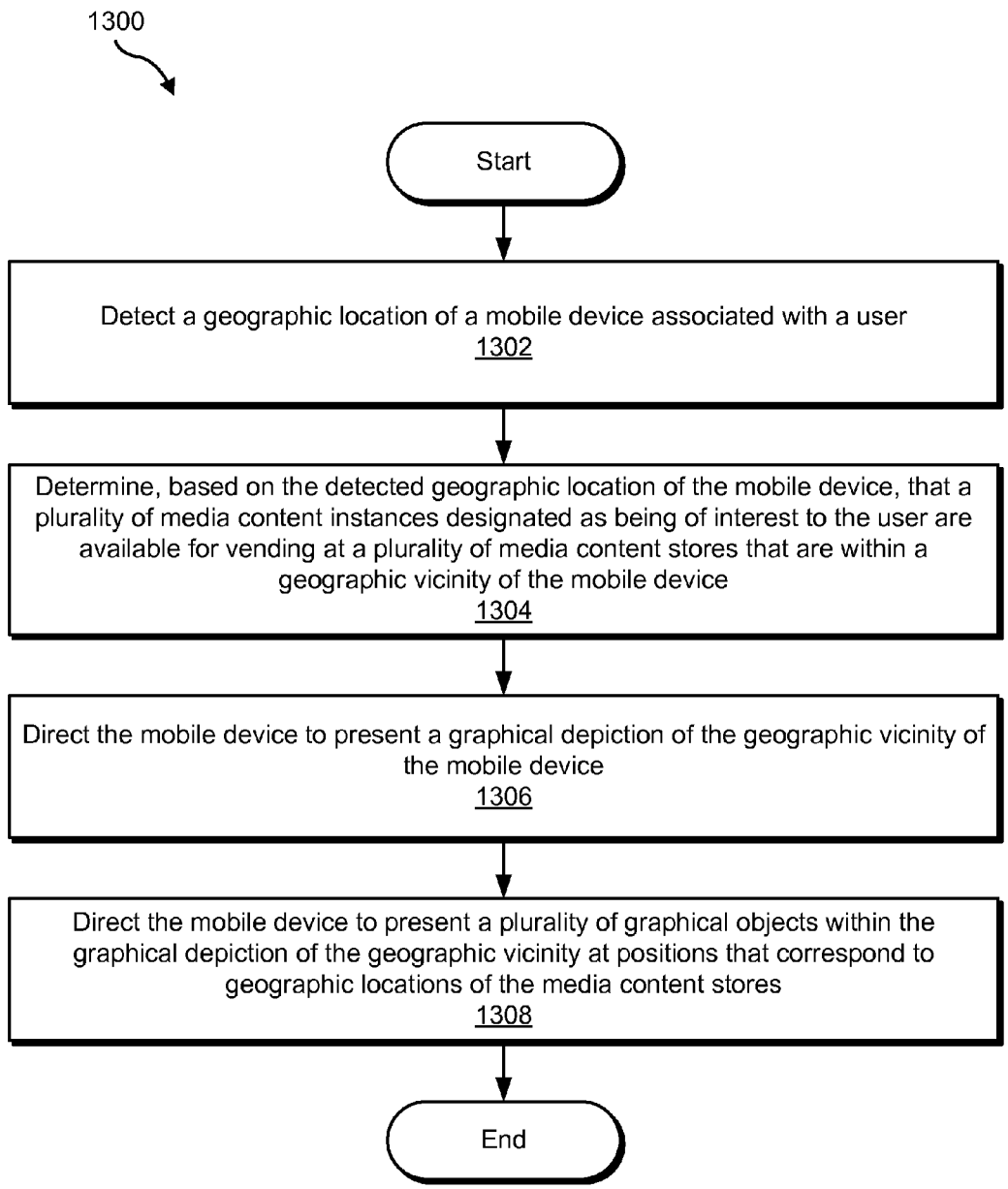
FIG. 13 illustrates another exemplary media content location method according to principles described herein.

FIG. 13 illustrates another exemplary media content location method 1300. While FIG. 13 illustrates exemplary steps according to one embodiment, other embodiments may omit, add to, reorder, and/or modify any of the steps shown in FIG. 13. One or more of the steps shown in FIG. 13 may be performed by media content location system 100 and/or any implementation thereof.

In step 1302, a media content location system detects a geographic location of a mobile device associated with a user. Step 1302 may be performed in any of the ways described herein.

In step 1304, the media content location system determines, based on the detected geographic location of the mobile device, that a plurality of media content instances designated as being of interest to the user are available for vending at a plurality of media content stores that are within a geographic vicinity of the mobile device. Step 1304 may be performed in any of the ways described herein.

In step 1306, the media content location system directs the mobile device to present a graphical depiction of the geographic vicinity of the mobile device. Step 1306 may be performed in any of the ways described herein.

In step 1308, the media content location system directs the mobile device to present a plurality of graphical objects within the graphical depiction of the geographic vicinity at positions that correspond to geographic locations of the media content stores. As described above, each graphical object included in the plurality of graphical objects represents an availability of one or more media content instances designated as being of interest to the user at a particular media content store located within the geographic vicinity of the mobile device. Step 1308 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
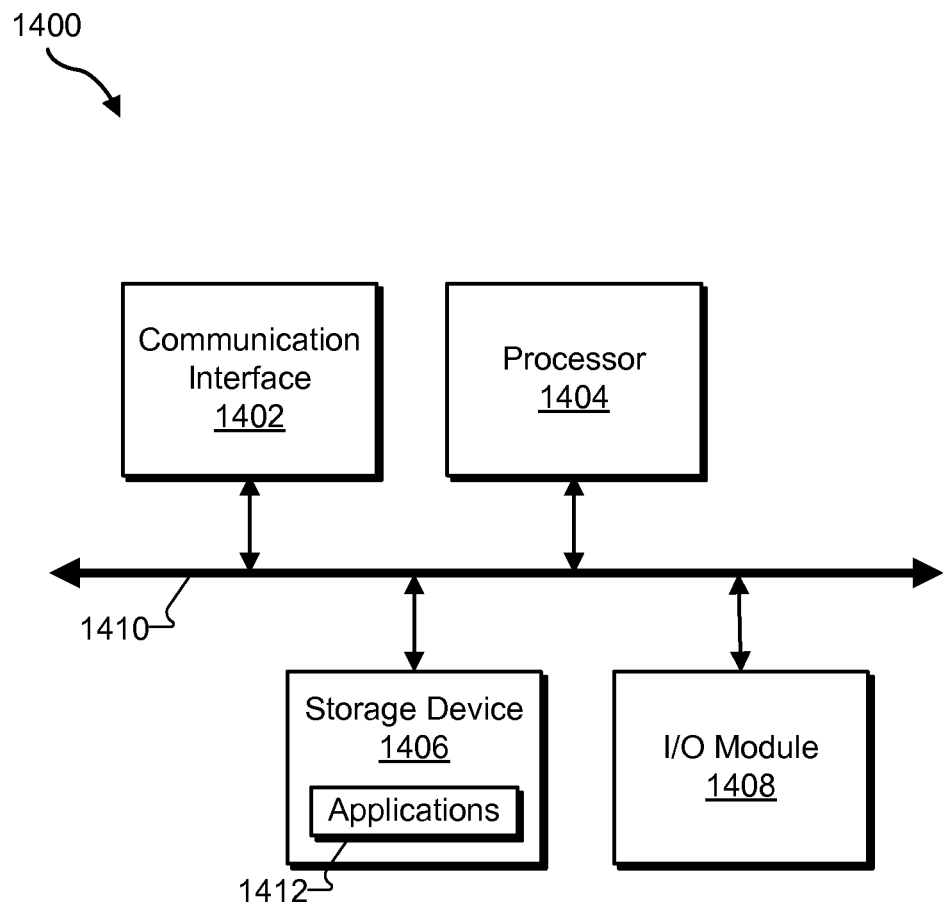
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems, subsystems, and/or facilities described herein may be implemented by or within one or more components of computing device 1400. For example, one or more applications 1412 residing within storage device 1406 may be configured to direct processor 1404 to perform one or more processes or functions associated with location tracking facility 102 and/or media content management facility 104. Likewise, storage facility 106 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by a media content location server located remotely from a media content store, a bookmarking, by a user, of a first media content instance and a second media content instance;

designating, by the media content location server in response to the bookmarking, the first media content instance and second media content instance as being of interest to the user;

detecting, by the media content location server subsequent to the designating, a geographic location of a mobile device associated with the user;

determining, by the media content location server based on the detected geographic location of the mobile device, that the first media content instance and the second media content instance designated as being of interest to the user are available for vending at the media content store that is within a geographic vicinity of the mobile device;

directing, by the media content location server, the mobile device to present a graphical depiction of the geographic vicinity of the mobile device;

directing, by the media content location server, the mobile device to present a first graphical object representative of the first media content instance and a second graphical object representative of the second media content instance within the graphical depiction of the geographic vicinity of the mobile device at a position that corresponds to a geographic location of the media content store and that indicates that both the first media content instance and the second media content instance are available at the media content store, the first graphical object including a first movie poster associated with the first media content instance and the second graphical object including a second movie poster associated with the second media content instance, wherein the first movie poster and the second movie poster are presented by the mobile device within the graphical depiction of the geographic vicinity of the mobile device adjacent to each other at the position that corresponds to the geographic location of the media content store;

determining, by the media content location server, that the mobile device enters into a geographic vicinity of the media content store, the geographic vicinity of the media content store being within the geographic vicinity of the mobile device;

directing, by the media content location server in response to the determining that the mobile device enters into the geographic vicinity of the media content store, the mobile device to present an interface associated with the media content store, the interface including an option to vend at least one of the first media content instance and the second media content instance bookmarked by the user; and directing, by the media content location server in response to a selection by the user of the option to vend at least one of the first media content instance and the second media content instance, the media content store and the mobile device to perform a vending transaction that results in at least one of the first media content instance and the second media content instance being vended to the user.

2. The method of claim 1, wherein the interface includes an option to browse media content available for vending at the media content store.

3. The method of claim 2, further comprising:

detecting, by the media content location server, a selection by the user of the option to browse the media content available for vending at the media content store;

directing, by the media content location server in response to the selection by the user of the option to browse the media content available for vending at the media content store, the mobile device to present a browsing interface; and personalizing, by the media content location server, the browsing interface to highlight one or more media content instances designated as being of interest to the user that are available for vending at the media content store.

4. The method of claim 1, wherein the interface includes an option to reserve a media content instance available for vending at the media content store for pickup by the user.

5. The method of claim 1, wherein the directing of the media content store and the mobile device to perform the vending transaction comprises:

directing the media content store to present an option to pick up the at least one of the first media content instance and the second media content instance;

detecting a selection by the user of the option to pick up the at least one of the first media content instance and the second media content instance;

directing, in response to the selection by the user of the option to pick up the at least one of the first media content instance and the second media content instance, the media content store to present a verification interface configured to allow the user to verify an identity of the user;

detecting a verification by the user of the identity of the user by way of the verification interface;

directing, in response to the verification by the user of the identity of the user, the mobile device to present an option to complete the vending transaction;

detecting a selection by the user of the option to complete the vending transaction; and directing, in response to the selection by the user of the option to complete the vending transaction, the media content store to vend the at least one of the first media content instance and the second media content instance.

6. The method of claim 1, further comprising:

determining, by the media content location server based on the detected geographic location of the mobile device, that an additional media content instance designated as being of interest to the user is available for vending at an additional media content store that is within the geographic vicinity of the mobile device; and directing, by the media content location server, the mobile device to present an additional graphical object representative of the additional media content instance within the graphical depiction of the geographic vicinity of the mobile device at a position that corresponds to a geographic location of the additional media content store.

7. The method of claim 1, further comprising:

determining, by the media content location server based on the detected geographic location of the mobile device, that the first media content instance is also available for vending at an additional media content store that is within the geographic vicinity of the mobile device; and directing, by the media content location server, the mobile device to present an additional graphical object representative of the first media content instance within the graphical depiction of the geographic vicinity of the mobile device at a position that corresponds to a geographic location of the additional media content store.

8. The method of claim 1, wherein the directing the mobile device to present the graphical depiction of the geographic vicinity of the mobile device comprises directing the mobile device to present a graphical depiction of a geographic map representative of the geographic vicinity of the mobile device.

9. The method of claim 1, wherein the directing the mobile device to present the graphical depiction of the geographic vicinity of the mobile device comprises directing the mobile device to present a graphical depiction of a radar image representative of the geographic vicinity of the mobile device.

10. The method of claim 1, further comprising designating, by the media content location server, the first media content instance as being of interest to the user prior to the determining that the first media content instance is available for vending at the media content store.

11. The method of claim 1, further comprising directing, by the media content location server, the mobile device to present a graphical object representative of the media content store within the graphical depiction of the geographic vicinity of the mobile device at a position that corresponds to the geographic location of the media content store.

12. The method of claim 1, further comprising directing, by the media content location server, the mobile device to present one or more graphical objects within the graphical depiction of the geographic vicinity of the mobile device that represent one or more amenities located within the geographic vicinity of the mobile device.

13. The method of claim 1, further comprising:
detecting, by the media content location server, a selection by the user of the first graphical object; and
directing, by the media content location server in response to the selection by the user of the first graphical object, the mobile device to present one or more options associated with the first media content instance represented by the first graphical object.

14. The method of claim 13, wherein the one or more options comprise an option to reserve the first media content instance for pickup at the media content store.

15. The method of claim 1, wherein the media content store is a movie vending kiosk and the first media content instance and the second media content instance are movies.

16. The method of claim 1, wherein the first graphical object further includes a first graphical indication of a first interest level of the user that is specific to the first media content instance and the second graphical object further includes a second graphical indication of a second interest level of the user that is specific to the second media content instance.

17. A method comprising:
detecting, by a media content location server located remotely from a media content store, a bookmarking, by a user, of a plurality of media content instances;
designating, by the media content location server in response to the bookmarking, the plurality of media content instances as being of interest to the user;
detecting, by the media content location server subsequent to the designating, a geographic location of a mobile device associated with the user;
determining, by the media content location server based on the detected geographic location of the mobile device, that the plurality of media content instances designated as being of interest to the user are available for vending at a plurality of media content stores that are within a geographic vicinity of the mobile device, the plurality of media content stores including the media content store;
directing, by the media content location server, the mobile device to present a graphical depiction of the geographic vicinity of the mobile device; and
directing, by the media content location server, the mobile device to present a plurality of graphical objects within the graphical depiction of the geographic vicinity of the mobile device at positions that correspond to geographic locations of the plurality of media content stores;
wherein each graphical object included in the plurality of graphical objects represents an availability of media content instances included in the plurality of media content instances designated as being of interest to the user at a particular media content store included in the plurality of media content stores that are within the geographic vicinity of the mobile device;
wherein the plurality of graphical objects include a first graphical object representative of a first media content instance included in the plurality of media content instances and a second graphical object representative of a second media content instance included in the plurality of media content instances, the first graphical object including a first movie poster associated with the first media content instance and the second graphical object including a second movie poster associated with the second media content instance, the first movie poster and the second movie poster being presented by the mobile device within the graphical depiction of the geographic vicinity of the mobile device adjacent to each other at a position that corresponds to a geographic location of the media content store included in the plurality of media content stores and that indicates that both the first media content instance and the second media content instance are available at the media content store; and
wherein the method further comprises:
determining, by the media content location server, that the mobile device enters into a geographic vicinity of the media content store, the geographic vicinity of the media content store being within the geographic vicinity of the mobile device;
directing, by the media content location server in response to the determining that the mobile device enters into the geographic vicinity of the media content store, the mobile device to present an interface associated with the media content store, the interface including an option to vend at least one of the first media content instance and the second media content instance bookmarked by the user; and
directing, by the media content location server in response to a selection by the user of the option to vend at least one of the first media content instance and the second media content instance, the media content store and the mobile device to perform a vending transaction that results in at least one of the first media content instance and the second media content instance being vended to the user.

18. The method of claim 17, further comprising:
identifying, by the media content location server, one or more other media content stores that are within the geographic vicinity of the mobile device and that do not have available for vending any of the media content instances designated as being of interest to the user; and
preventing, by the media content location server, the mobile device from presenting one or more graphical objects representative of the one or more other media content stores within the graphical depiction of the geographic vicinity.

19. A system comprising:
a location tracking facility that is provided at a server located remotely from a media content store and that detects a geographic location of a mobile device associated with a user; and
a media content management facility communicatively coupled to the location tracking facility at the server and that
detects a bookmarking, by the user, of a first media content instance and a second media content instance,
designates, in response to the bookmarking, the first media content instance and second media content instance as being of interest to the user,
determines, based on the detected geographic location of the mobile device, that the first media content instance and the second media content instance designated as being of interest to the user are available for vending at the media content store that is within a geographic vicinity of the mobile device,
directs the mobile device to present a graphical depiction of the geographic vicinity of the mobile device, directs the mobile device to present a first graphical object representative of the first media content instance and a second graphical object representative of the second media content instance within the graphical depiction of the geographic vicinity of the mobile device at a position that corresponds to a geographic location of the media content store and that indicates that both the first media content instance and the second media content instance are available at the media content store, the first graphical object including a first movie poster associated with the first media content instance and the second graphical object including a second movie poster associated with the second media content instance, wherein the first movie poster and the second movie poster are presented by the mobile device within the graphical depiction of the geographic vicinity of the mobile device adjacent to each other at the position that corresponds to the geographic location of the media content store;

directs, in response to a determination by the location tracking facility that the mobile device enters into a geographic vicinity of the media content store, the mobile device to present an interface associated with the media content store, the interface including an option to vend at least one of the first media content instance and the second media content instance bookmarked by the user, the geographic vicinity of the media content store being within the geographic vicinity of the mobile device; and directs, in response to a selection by the user of the option to vend at least one of the first media content instance and the second media content instance, the media content store and the mobile device to perform a vending transaction that results in at least one of the first media content instance and the second media content instance being vended to the user.

\* \* \* \* \*